United States Patent
Ganev et al.

(10) Patent No.: US 7,391,125 B2
(45) Date of Patent: Jun. 24, 2008

(54) ELECTRICAL POWER GENERATION SYSTEM AND METHOD FOR MITIGATING CORONA DISCHARGE

(75) Inventors: Evgeni Ganev, Torrance, CA (US); Mike S. Koerner, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 112 days.

(21) Appl. No.: 11/457,041

(22) Filed: Jul. 12, 2006

(65) Prior Publication Data

US 2006/0244266 A1 Nov. 2, 2006

Related U.S. Application Data

(63) Continuation-in-part of application No. 10/805,767, filed on Mar. 22, 2004, now Pat. No. 7,019,415, and a continuation-in-part of application No. 11/333,827, filed on Jan. 17, 2006, now abandoned.

(51) Int. Cl.
*H02K 15/00* (2006.01)

(52) U.S. Cl. .............................. 290/1 A; 290/52; 310/42

(58) Field of Classification Search ................. 290/1 A, 290/2, 52; 310/42, 58; 60/39.33
See application file for complete search history.

(56) References Cited

U.S. PATENT DOCUMENTS

| | | | |
|---|---|---|---|
| 3,279,176 A * | 10/1966 | Boden | 60/202 |
| 4,207,485 A | 6/1980 | Silver | |
| 4,644,202 A * | 2/1987 | Kroy et al. | 310/58 |
| 5,455,470 A | 10/1995 | Denk et al. | |
| 5,519,274 A | 5/1996 | Scharrer | |
| 5,649,418 A * | 7/1997 | Ludwig | 60/801 |
| 5,801,464 A | 9/1998 | Brezoczky | |
| 6,135,640 A | 10/2000 | Nadafi | |
| 6,246,138 B1 | 6/2001 | Nims | |
| 6,353,273 B1 | 3/2002 | Heshmat et al. | |
| 6,373,156 B2 | 4/2002 | Suzuki et al. | |
| 6,469,411 B2 | 10/2002 | Lembke | |
| 6,483,215 B1 | 11/2002 | Bodmer et al. | |
| 6,668,539 B2 | 12/2003 | Schlote | |
| 6,720,685 B2 * | 4/2004 | Balas | 310/42 |
| 7,019,415 B2 | 3/2006 | Ganev et al. | |
| 2002/0050719 A1 | 5/2002 | Caddell et al. | |
| 2002/0079765 A1 | 6/2002 | Lembke | |
| 2002/0089245 A1 | 7/2002 | Chen et al. | |

* cited by examiner

*Primary Examiner*—Nicholas Ponomarenko
(74) *Attorney, Agent, or Firm*—Oral Caglar, Esq.

(57) ABSTRACT

A power generation system including a housing defining a cavity and having an inlet for receiving a fluid that is used to cool and pressurize the cavity and an outlet for removing the fluid from the cavity. The system also may include a rotor having a first end positioned within the cavity of the housing and a second end, a plurality of bearings, positioned to contact the rotor, for providing radial support to the rotor, and a turbine connected to the second end of the rotor. Further, the system may include a heat sink positioned within the cavity and between the housing and the rotor, and an electronic component attached to the heat sink.

9 Claims, 7 Drawing Sheets

ELECTRICAL POWER GENERATION SYSTEM AND METHOD FOR MITIGATING CORONA DISCHARGE

CROSS-REFERENCE TO RELATED APPLICATIONS

This is a continuation-in-part of U.S. patent application Ser. No. 11/333,827, filed on Jan. 17, 2006 which was a continuation in part of U.S. patent Ser. No. 10/805,767, filed on Mar. 22, 2004 and issued as U.S. Pat. No. 7,019,415 on Mar. 28, 2006, both of which are hereby incorporated by reference in their entirety.

BACKGROUND OF THE INVENTION

The invention relates generally to power generation systems for space applications such as re-useable launch vehicles, and more particularly to an electrical power generation system and method for mitigating corona discharge.

Reusable space vehicles use power generation systems for providing power during launch and recovery. For example, the space shuttle uses hydrazine-fueled, turbine-driven, gearbox-mounted hydraulic pumps to provide power for thrust-vector and flight control actuation. Alternative electric power generation systems operate at high voltages in order to minimize their size and weight. During ascent and re-entry, these space vehicles are exposed to low ambient pressures.

These systems, however, have several drawbacks. For example, these systems are very costly, complex and require many auxiliary systems, such as oil lubrication systems, to operate. In addition, these systems are dangerous to operate due to the need to handle highly toxic propellants such as hydrazine. Furthermore, these systems emit damaging corona discharge during ascent and re-entry.

Thus, it should be appreciated that there is a need for a high-power electrical power generation system that does not use an oil lubrication system, use toxic propellants and emit corona discharge. The invention fulfills this need as well as others.

SUMMARY OF THE INVENTION

The invention relates to systems and methods for mitigating corona discharge. In one aspect of the invention there is provided a power generation system including a housing defining a chamber and having an inlet for receiving a fluid that is used to cool and pressurize the chamber and an outlet for removing the fluid from the cavity. The system also may include a rotor having a first end positioned within the cavity of the housing and a second end, a plurality of bearings positioned to provide radial support to the rotor, and a turbine connected to the second end of the rotor. The system may further include either a system for discarding of the fluid or a system for cooling and recycling the fluid back to the inlet, wherein the system for disposing of the fluid or the system for recycling the fluid back to the inlet is in fluid communication with the outlet. Further, the system may include a heat sink positioned within the cavity and between the housing and the rotor, and an electrical device (e.g., an electronic component) attached to the heat sink.

In another aspect of the invention there is provided an electrical power generation system including an outer housing defining a chamber. The outer housing includes an input conduit for receiving a fluid that is used to cool and pressurize the chamber and an output conduit for removing the fluid from the chamber. The system may further includes a heat exchanger, the heat exchanger receiving the fluid from the output conduit, wherein the heat exchanger cools the fluid and a pump or compressor wherein the pump or compressor pumps the fluid from the heat exchanger to the input conduit. The system may also includes a turbine positioned adjacent to the outer housing, a rotor positioned within the chamber and connected to the turbine for rotating about a central axis, and an inner housing positioned within the chamber and between the outer housing and the rotor. Further, the system may include a plurality of electronic components attached to the inner housing and cooled by the fluid, a stator attached to the inner housing and adjacent to the rotor, and a plurality of bearings, positioned adjacent to the stator, for providing radial support to the rotor and cooled by the fluid.

In a further aspect of the invention there is provided a method for mitigating corona discharge including introducing a fluid into a cavity defined by an outer housing, the fluid being used to pressurize the cavity and to cool a rotor, a stator, a plurality of bearings and a plurality of electrical components. The method may also include removing the fluid from the cavity and discarding thereof.

In yet another aspect of the invention there is provided a method for mitigating corona discharge including introducing a fluid into a cavity defined by an outer housing, the fluid being used to pressurize the cavity and to cool a rotor, a stator, a plurality of bearings and a plurality of electrical components. The method may also include removing the fluid from the cavity, cooling the fluid removed from the cavity and reintroducing the cooled fluid into the cavity.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
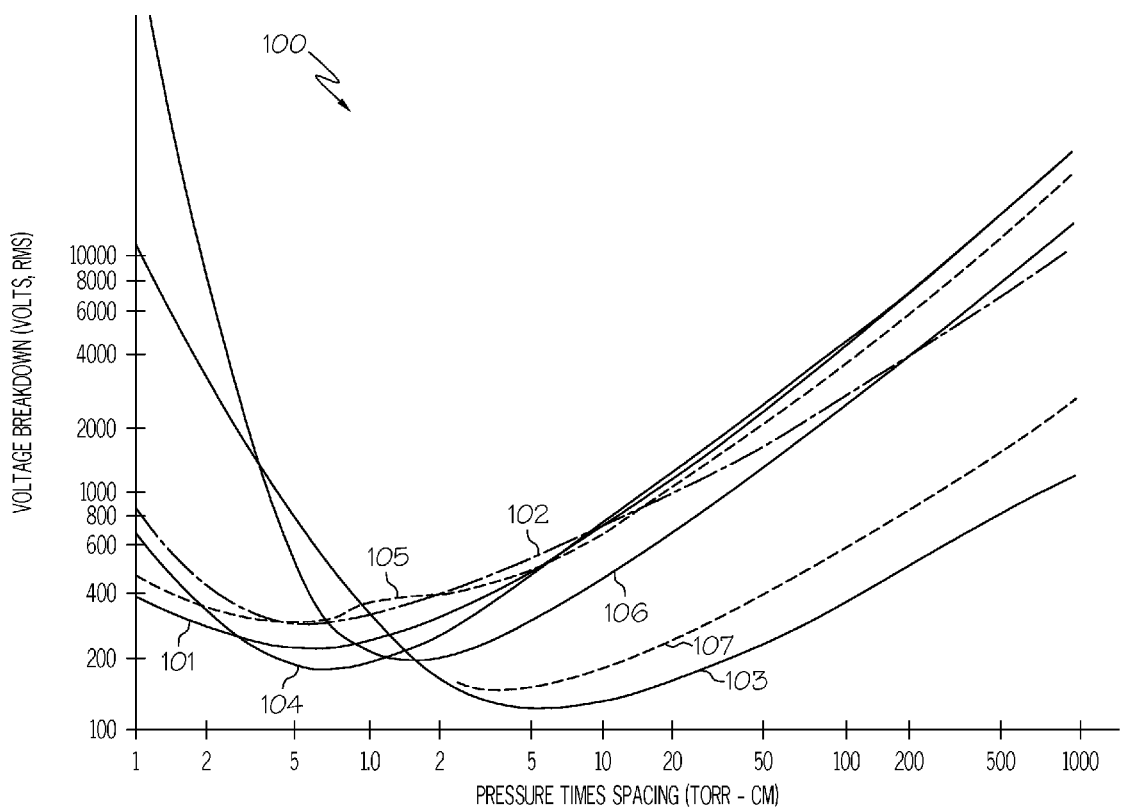
FIG. 1 is a graph showing Paschen curves for air, carbon dioxide, helium, nitrogen, oxygen, hydrogen and neon gases at room temperature.

Referring now more particularly to the drawings, FIG. 1 is a graph 100 showing Paschen curves 101-107 for air, carbon dioxide, helium, nitrogen, oxygen, hydrogen and neon gases at room temperature. The Paschen curves 101-107 identify the breakdown voltages between parallel plates of the various gases shown in FIG. 1. In particular, these Paschen curves 101-107 show the breakdown voltage of the gas (y-axis) as a function of the gas pressure times the spacing of the gap (x-axis), for example, between the parallel plates. The gap is generally measured to be the distance between the parallel plates across which the voltage is applied. The gap represents the maximum open distance parallel to an applied electric field. A characteristic of the Paschen curves 101-107 is that the breakdown voltage of the device is increased at any pressure by increasing the spacing of the gap. That is, in a fixed electric field, the breakdown voltage across the gap becomes smaller as the gap becomes smaller, and according to the Paschen curves 101-107, this increases the breakdown voltage of the device. In the illustrated embodiment, hydrogen and oxygen gases are used as the coolants, lubricants and propellants for the electrical power generation system. However, one skilled in the art will be able to implement the invention using other gases including, but not limited to, the gases shown in FIG. 1. Alternatively, separate gases may be used where one gas may be used for the combined coolant and lubricant and a separate gas used as the propellant.

Figure 2A:
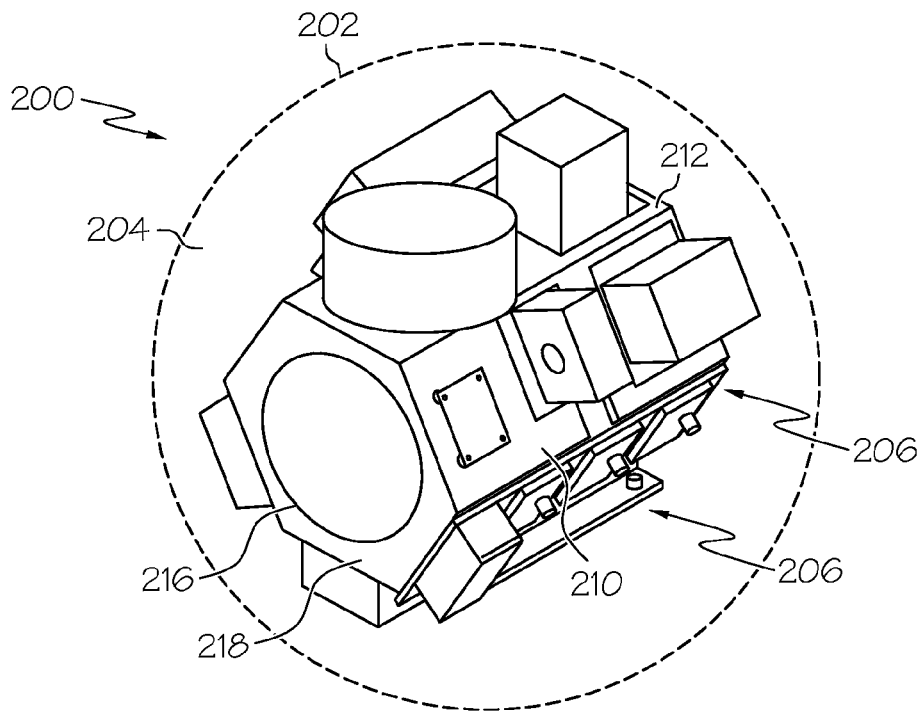
FIG. 2A is a perspective view of an electrical power generation system with its outer housing removed so that the components and electronics within the outer housing can be viewed according to an embodiment of the invention.
Figure 2B:
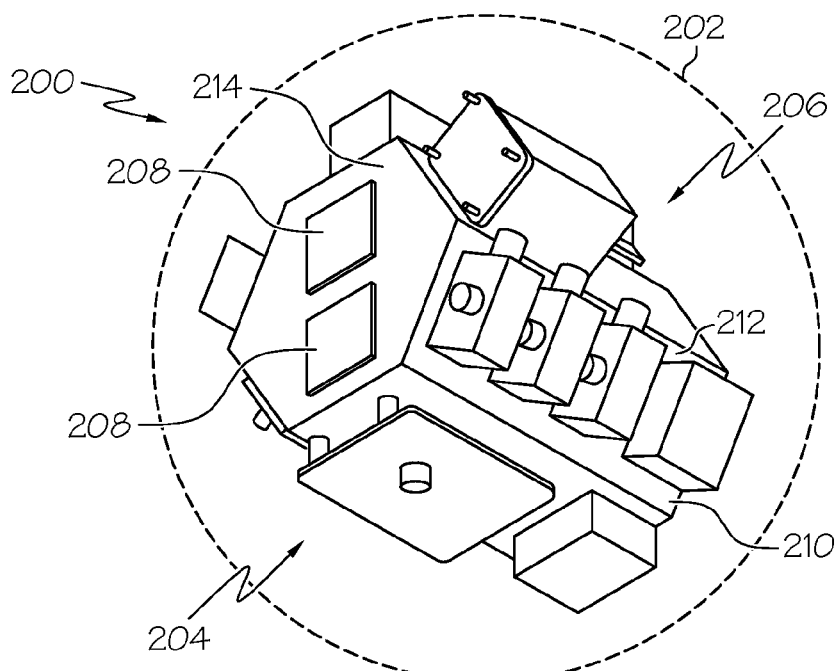
FIG. 2B is a perspective view of an electrical power generation system with its outer housing removed so that the components and electronics within the outer housing can be viewed according to an embodiment of the invention.

FIGS. 2A, 2B are perspective views of an electrical power generation system 200 with its outer housing 202 removed so that the components and electronics within the outer housing 202 can be viewed. The electrical power generation system 200 is typically a 270-volt dc electric power generation system used in space applications where a hydrogen gas is used as the turbine fuel. The outer housing 202 has a substantially air-tight chamber 204 for housing the components and electronics that make up the electrical power generation system 200. The outer housing 202 may be made of aluminum, steel, titanium or other metallic material and is used to protect the components and high-voltage electronics (e.g., power electronics 206 and signal electronics 208) from external factors. The power electronics 206 are typically mounted on an outer surface 210 of a cold plate 212 (can also be referred to as an inner housing), the signal electronics 208 are typically mounted on a first side surface 214 of the outer housing 202 and a turbine wheel 216 is typically positioned adjacent to a second side surface 218 of the outer housing 202. The first side surface 214 is generally positioned opposite the second side surface 218.

The components are generally contained within the outer housing 202 and the power electronics 206 are generally mounted to the cold plate 212. In one embodiment, the components and the electronics are housed within the outer housing 202. The cold plate 212 may be made of aluminum, steel, titanium or other metallic material and functions and serves as a common heat exchanger or heat sink. In the illustrated embodiment, the power electronics 206 are mounted around a hexagonal shaped cold plate 212 and the signal electronics 208 are mounted on the first side surface 214 of the outer housing 202.

Figure 3:
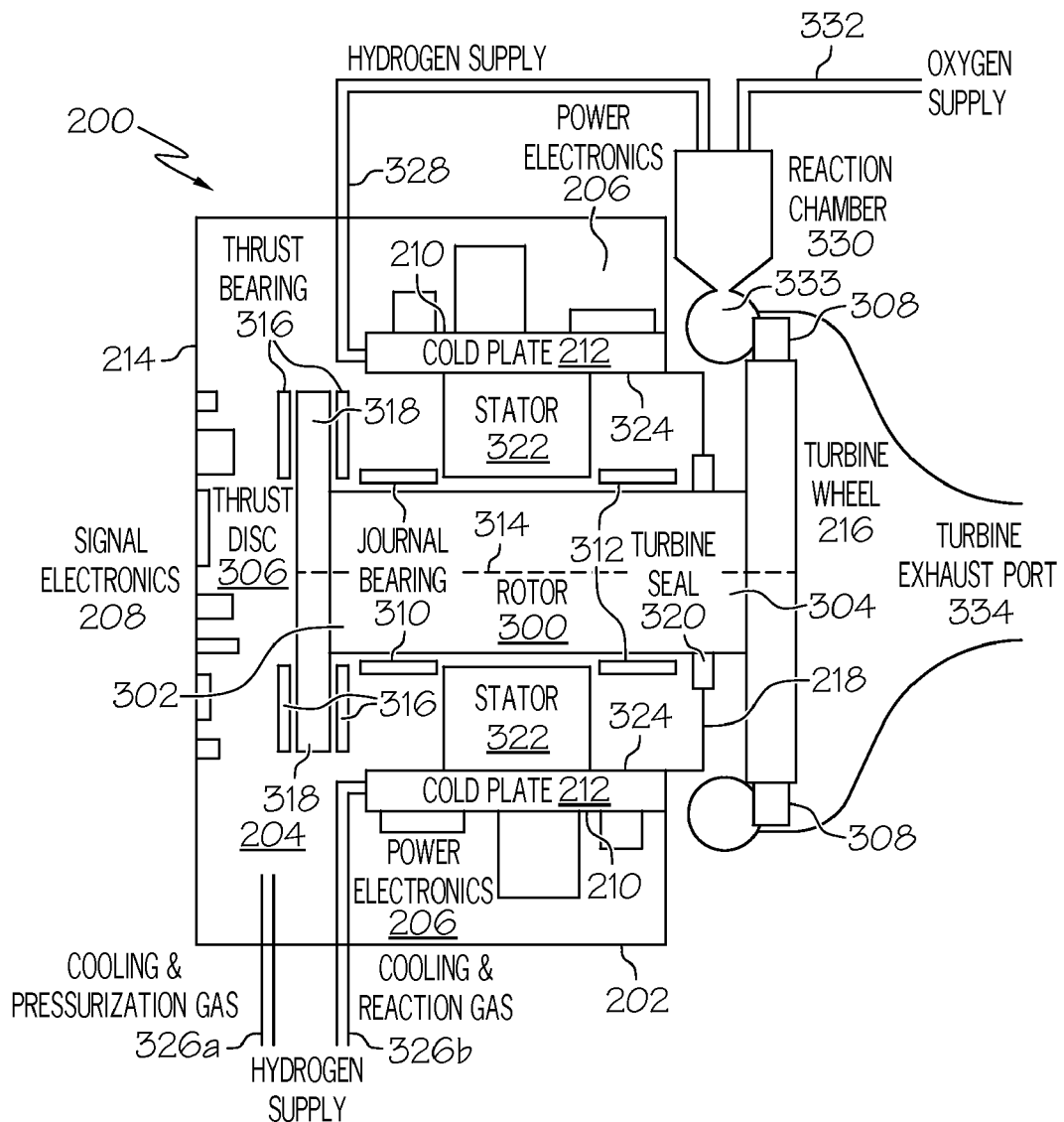
FIG. 3 is a cross-sectional view illustrating the physical layout of the components and electronics of the electrical power generation system of FIGS. 2A, 2B according to a first embodiment of the invention.

FIG. 3 is a cross-sectional view illustrating the physical layout of the components and electronics of the electrical power generation system 200 of FIGS. 2A, 2B. The electrical power generation system 200 includes a rotor 300 that may be cylindrical in shape and that has a first end 302 and a second end 304 wherein the first end 302 is positioned within the chamber of the outer housing, a thrust disc 306 that is connected to the first end 302 of the rotor 300, the turbine wheel 216 that is connected to the second end 304 of the rotor 300 and a set of turbine blades 308 that are attached about the circumference of the turbine wheel 216. The electrical power generation system 200 further includes a first set of journal bearings 310 that are circumferentially positioned around the first end 302 of the rotor 300 and a second set of journal bearings 312 that are circumferentially positioned around the second end 304 of the rotor 300. The first and second sets of journal bearings 310, 312 provide radial support to the rotor 300. The rotor 300 is mounted or rotates on the first and second sets of journal bearings 310, 312. The first and second sets of journal bearings 310, 312 are used to assist the rotor 300 in rotating concentrically about a central axis 314. In one embodiment, the first and second sets of journal bearings 310, 312 are radially spaced from the central axis 314. The turbine wheel 216 is mounted in a fixed orientation, without any gears, to the rotor 300. In one embodiment, the turbine wheel 216 may be an axial-impulse turbine wheel or any other type of turbine wheel.

The electrical power generation system 200 also includes a plurality of thrust bearings 316 that are circumferentially positioned around an outer portion 318 of the thrust disc 306 to provide axial support to the rotor 300. The thrust disc 306 is mounted or rotates on the plurality of thrust bearings 316. The plurality of thrust bearings 316 are radially spaced around the central axis 314 and are used to maintain the rotor axial position. The rotor 300, the thrust disc 306, the turbine wheel 216, and the turbine blades 308 are configured to rotate about the central axis 314 at substantially the same revolutions per minute. In one embodiment, the first and second sets of journal bearings 310, 312 and the plurality of thrust bearings 316 are self-acting, hydrodynamic foil bearings. Hence, the rotor 300 and the thrust disc 306 may be mounted on foil bearings. When foil bearings are used, no oil lubrication for the bearings is required. Other types of bearings such as externally pressurized hydrostatic bearings, gas cooled ceramic ball bearings, magnetic bearings with a pressurized cooling fluid or any other types of bearings can be used.

A ring-shaped turbine seal 320 is positioned around the second end 304 of the rotor 300 to provide a substantially air tight seal between the rotor 300 and the housing 202. The ring-shaped turbine seal 320 provides a seal so that the gas inside the chamber 204 is maintained within the chamber 204. The ring-shaped turbine seal 320 may be a floating ring seal or similar device.

The electrical power generation system 200 also includes a stator 322 attached to an inner surface 324 of the cold plate 212. The stator 322 is positioned around the rotor 300 and between the first and second sets of journal bearings 310, 312. The stator 322 is mounted in a stationary position relative to the cold plate 212.

As shown in FIG. 3, the power electronics 206, the signal electronics 208, the cold plate 212, the rotor 300, the thrust disc 306, the first and second sets of journal bearings 310, 312, the plurality of thrust bearings 316 and the stator 322 are contained within or housed inside the outer housing 202. The outer housing 202 includes one or more inlets or input conduits 326 for allowing a fluid to enter the chamber 204 and one or more outlets or output conduits 328 for allowing the fluid to exit the chamber 204. In one embodiment, a first conduit 326a is positioned to direct the fluid into the chamber 204 to cool and pressurize the chamber 204 and the power electronics 206 and a second conduit 326b is positioned to direct the fluid toward or into the cold plate 212 to cool the cold plate 212. Cooling the cold plate 212 also cools the power electronics 206 and the stator 322, which are attached to the cold plate 212.

Figure 6:
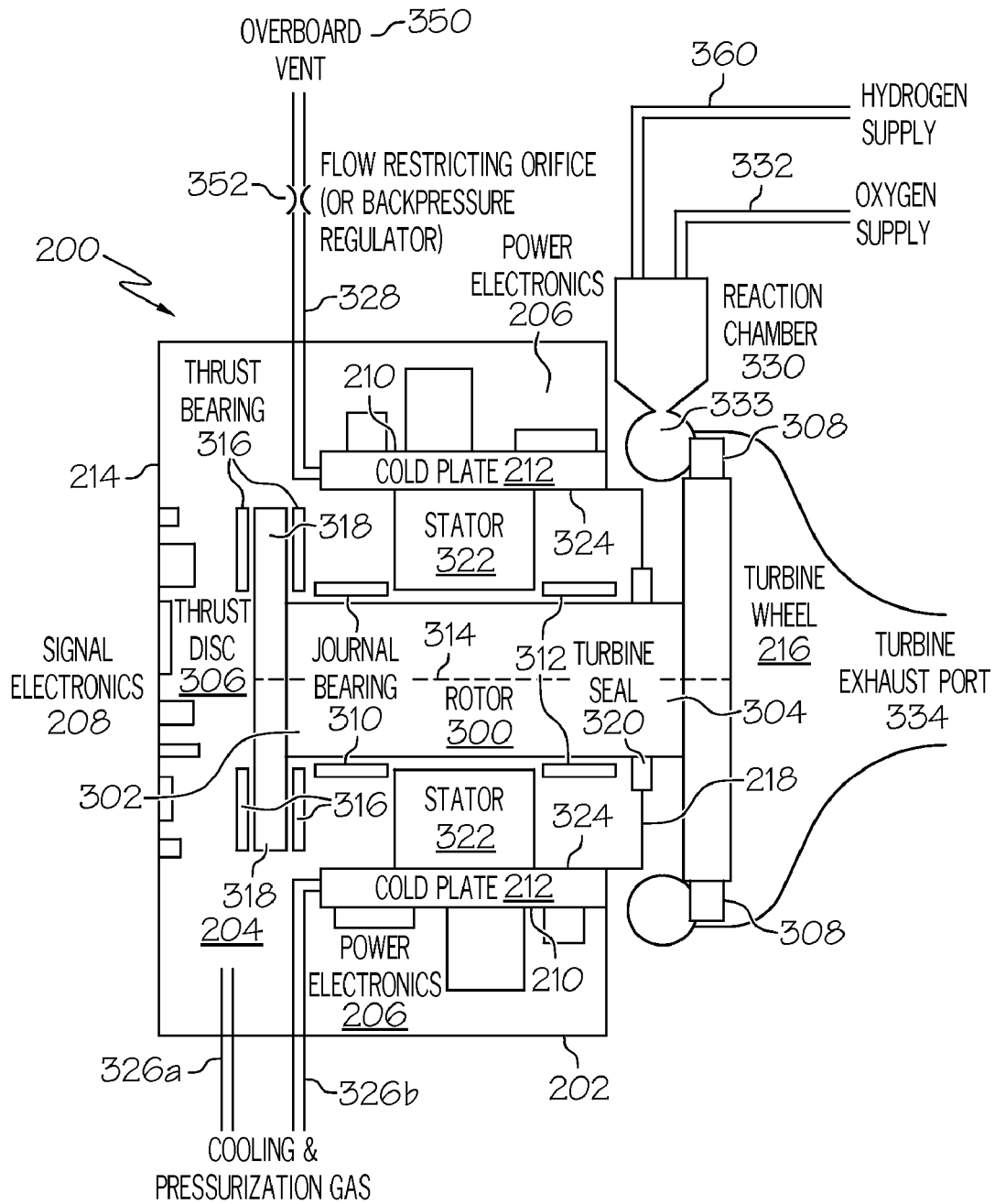
FIG. 6 is a cross-sectional view illustrating the physical layout of the components and electronics of the electrical power generation system of FIGS. 2A, 2B according to a second embodiment of the invention.
Figure 7:
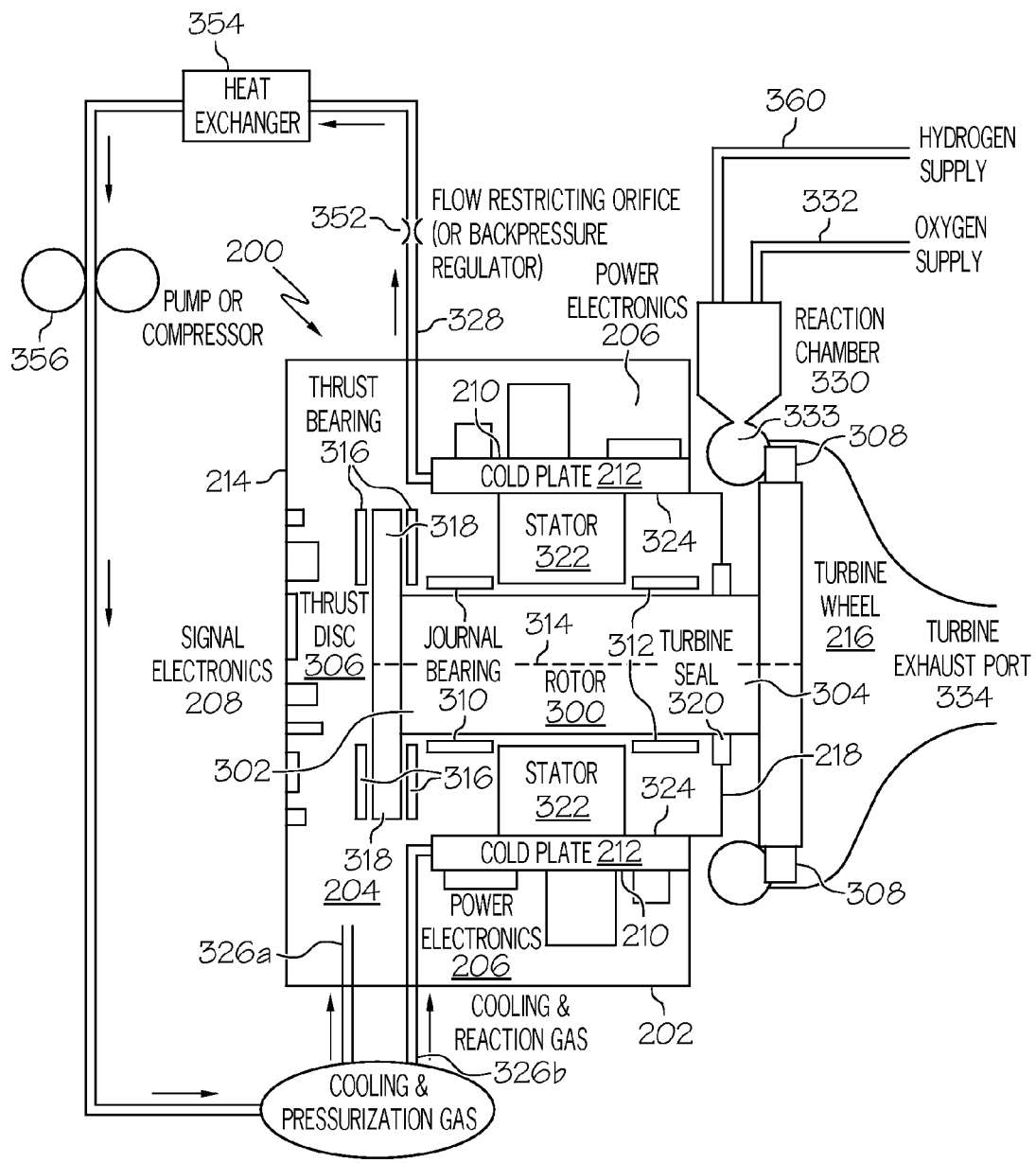
FIG. 7 is a cross-sectional view illustrating the physical layout of the components and electronics of the electrical power generation system of FIGS. 2A, 2B according to a third embodiment of the invention.

The output conduit 328 allows the fluid to be removed from the chamber 204 and the cold plate 212. In one illustrative embodiment, the fluid exiting the chamber 204 may be directed to a reaction chamber 330 through the output conduit 328 where it may be combined with another fluid supplied through a first reaction chamber conduit line 332, where the fluids are reacted to produce power to operate the turbine wheel 216. Alternatively, the fluid removed from chamber 204 may be directed toward either a system for discarding of the fluid or a system for recycling the fluid back to the first and second input conduits 326a, 326b. The system for discarding the fluid and/or the system for recycling the fluid may be in fluid communication with output conduit 328. In an illustrative embodiment, the fluid exiting chamber 204 may be discarded by venting overboard or to a waste receptacle through the output conduit 328 to overboard vent 350 (FIG. 6). A third fluid may then be directed to the reaction chamber 330 through a second reaction chamber conduit line 360. In yet another illustrative embodiment, the fluid exiting chamber 204 may be cooled by some external means such as, but not limited to, a heat exchanger 354 and then pumped back into the chamber 204 through first and second conduits 326a, 326b by a pump or compressor 356 (FIG. 7). In either of the latter two illustrative embodiments, it may be beneficial to include a flow restricting orifice or back-pressure regulator 352 in the output conduit 328 exiting the chamber to maintain the pressure in the chamber 204. The input conduits 326a,b are generally located at one end of the outer housing 202 and the output conduit 328 is generally located at an opposite end of the outer housing 202 to ensure that the fluid travels throughout the chamber 204 to cool all the components within the chamber 204. In one embodiment, the fluid is constantly fed into the input conduits 326a,b, travels through the chamber 204 to cool and pressurize the components, the power electronics 206 and the signal electronics 208 within the chamber 204, and may travel through the output conduit 328 to either the reaction chamber 330, or through the pressure restricting orifice or backpressure regulator 352 to either the overboard vent 350 or via the external heat exchanger 354 and pump 356 back to the chamber 204. The pressure within outer housing 202 is maintained at a substantially constant pressure value by metering the flow of fluid into the chamber 204 via the input conduits 326a,b.

The fluid may be a gas such as a hydrogen gas, helium gas, nitrogen gas or oxygen gas; a liquid such as alcohol, liquid rocket propellant, liquid hydrogen, liquid nitrogen or liquid oxygen; or combinations thereof. The fluid can be used as a bearing process fluid to lubricate the first and second sets of journal bearings 310, 312 and the plurality of thrust bearings 316, a cooling fluid to cool the components (e.g., the cold plate 212, the rotor 300, the thrust disc 306, the first and second sets of journal bearings 310, 312, the plurality of thrust bearings 316 and the stator 322) and the high-voltage electronics contained within the housing 202, and a pressurizing fluid to pressurize the chamber 204, which in turn pressurizes the high-voltage electronics. Hence, the same fluid is advantageously used as a lubricant, coolant, and pressurizer for the electrical power generation system 200. Therefore, separate fluids are not required for each of these different purposes. In one illustrative embodiment, the fluid may also be used as a fuel, being supplied to the reaction chamber 330 after being used to lubricate, cool and pressurize the electrical power generation system 200. The fluid may be cooling, reaction and pressurization gases such as, but not limited to, fuels such as hydrogen, methane, butane, or other light hydrocarbons; or oxidizers such as oxygen or nitrous oxide. Other reactive gases might also be contemplated. Alternatively, cooling and reaction fluids might include any of the cooling reaction and pressurization gases but could also include liquid fuels such as liquid hydrogen, jet fuel or RP1; and liquid oxidizers such as liquid oxygen, hydrogen peroxide, nitrogen tetraoxide or nitric acid. Other reactive fluids might also be considered.

If the fluid is not used as a fuel source, cooling and pressurizations gases may be, but not limited to, any of the cooling, reaction and pressurization gases listed above, as well as nitrogen gas, helium gas, or other inert gases such as argon on xenon. The use of other cooling gases may also be contemplated.

Locating the power electronics 206 and the signal electronics 208 within the chamber 204 advantageously allows the fluid to be used to cool and pressurize the components and electronics. The design may also be advantageous for also allowing the fluid to be used as a propellant (i.e., fuel) and/or reactant for the reaction chamber 330. An additional advantage includes providing corona mitigation with little to no additional complexity and cost and thus virtually eliminating the need for more complex systems or methods of corona mitigation. Furthermore, the electrical power generation system 200 does not require a separate cooling system, housing or pressure vessel or pressurization system for the power electronics 206.

The electrical power generation system 200 may include a supply conduit 332 for supplying a second fluid into the reaction chamber 330. The second fluid may be one which is capable of being chemically reacted with the first fluid. For example, if the first fluid is a hydrogen gas, the second fluid might be an oxygen gas. The reaction chamber 330 mixes the fluid (e.g., a hydrogen gas) and the second fluid (e.g., an oxygen gas) and reacts them to produce reaction products, which may then be used to produce thrust or drive a turbine wheel. Other propellant combinations can be used to produce combustion reaction products. The combustion reaction products are discharged through a discharge port 333 of the reaction chamber 330 to a turbine exhaust port 334 causing the turbine blades 308 and the turbine wheel 216 to rotate about the central axis 314. Hence, the combustion reaction products are used as the propellant for the turbine wheel 216.

The rotation of the turbine wheel 216 generates power for the electrical power generation system 200.

Figure 4:
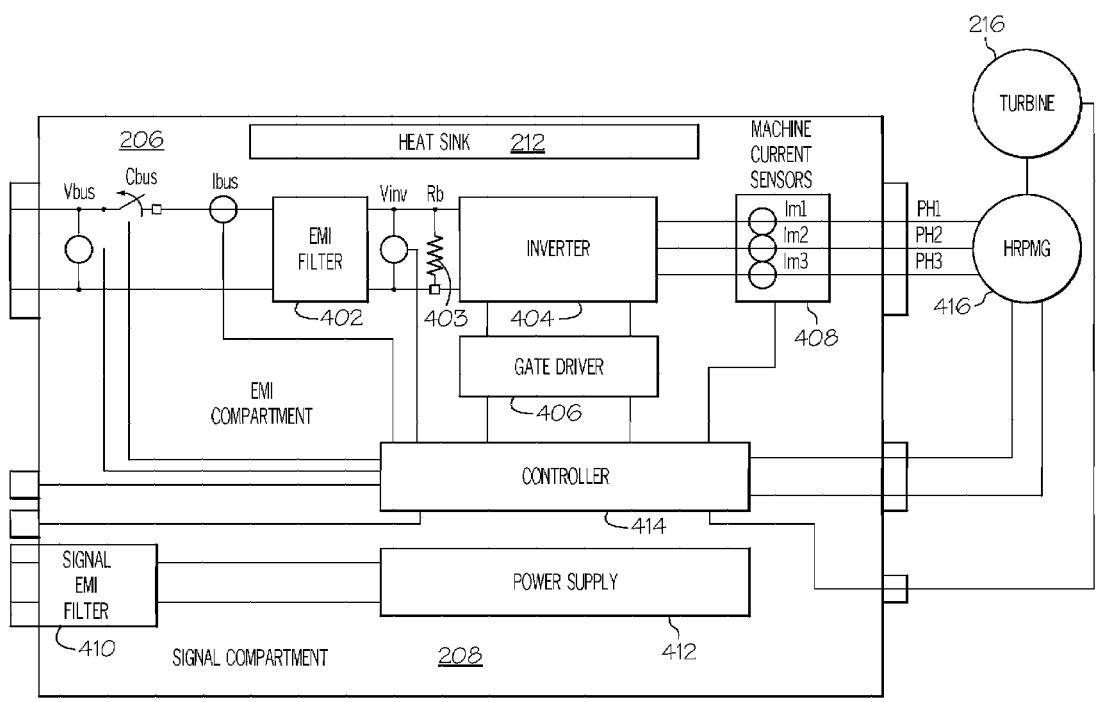
FIG. 4 is a block diagram illustrating an electrical system architecture of the power electronics and the signal electronics of the electrical power generation system of FIGS. 2A, 2B according to an embodiment of the invention.

FIG. 4 is a block diagram illustrating an electrical system architecture of the power electronics 206 and the signal electronics 208 of the electrical power generation system 200 of FIGS. 2A, 2B. The power electronics 206 may include an electromagnetic interference (EMI) filter 402, a bleed resistor 403, an inverter 404, a gate driver 406 and current sensors 408. The signal electronics 208 may include a signal EMI filter 410, a power supply 412 and a controller 414 (e.g., a digital or analog controller). The power electronics 206 and the signal electronics 208 may be referred to as electrical components. The combination of the rotor 300 and the stator 322 can be referred to as a high-reactance permanent-magnet generator (HRPMG) 416. The power electronics 206 and the signal electronics 208 are mounted to the outer housing 202 and are located within the chamber 204. The current sensors 408 measure the current between the power electronics 206 and the HRPMG 416. One skilled in the art will be able to make the electrical power generation system 200 using the electrical schematic shown in FIG. 4.

Figure 5:
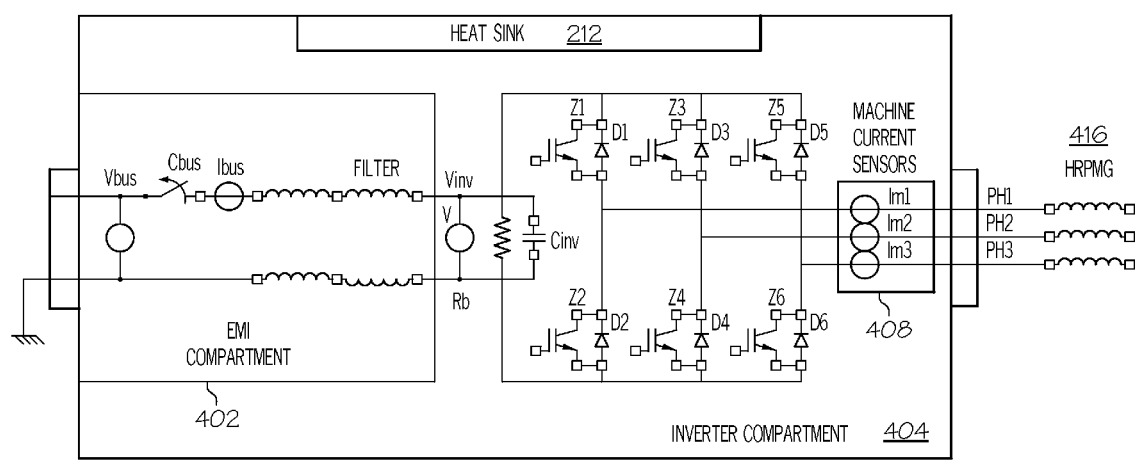
FIG. 5 is a block diagram illustrating an electrical power topology of the EMI filter, the inverter and the current sensors of the power electronics of FIG. 4 according to an embodiment of the invention.

FIG. 5 is a block diagram illustrating an electrical power topology of the EMI filter 402, the inverter 404 and the current sensors 408 of the power electronics 206 of FIG. 4. One skilled in the art will be able to make the electrical power generation system 200 using the electrical schematic shown in FIG. 5.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

We claim:

1. A power generation system for mitigating corona discharge, comprising:
   a housing defining a chamber and having an inlet for receiving a fluid that is used to cool and pressurize the chamber and an outlet for removing the fluid from the chamber;
   a rotor having a first end positioned within the chamber of the housing and a second end;
   a plurality of bearings positioned to provide radial support to the rotor;
   a turbine connected to the second end of the rotor;
   a heat sink positioned within the chamber and between the housing and the rotor;
   an electronic component attached to the heat sink;
   a system for discarding of the fluid; and
   a system for cooling and recycling the fluid back to the inlet,
   wherein the system for discarding the fluid and the system for cooling and recycling the fluid back to the inlet are in fluid communication with the outlet.

2. The system as defined in claim 1, wherein the fluid is selected from a group consisting of a hydrogen gas, a nitrogen gas, a helium gas, a argon gas, a xenon gas, an oxygen gas, an alcohol, a liquid rocket propellant, a liquid hydrogen, a liquid nitrogen, a liquid oxygen and combinations thereof.

3. The system as defined in claim 1, wherein the fluid is introduced into the cavity at a substantially constant rate.

4. The system as defined in claim 1 wherein the system for discarding the fluid is an overboard vent connected to the outlet.

5. The system as defined in claim 1 wherein the system for recycling the fluid back to the inlet comprises:
   a heat exchanger, the heat exchanger receiving the fluid from the outlet, wherein the heat exchanger cools the fluid; and
   a pump or compressor wherein the pump or compressor pumps the fluid from the heat exchanger to the inlet.

6. The system as defined in claim 1, wherein the electrical device is selected from a group consisting of an electromagnetic interference filter, a resistor, an inverter, a gate driver, a sensor, a power supply, a controller and combinations thereof.

7. The system as defined in claim 1, further comprising a thrust disc connected to the first end of the rotor and a plurality of thrust bearings, positioned to contact the thrust disc, for providing axial support to the rotor.

8. The system as defined in claim 7, wherein the plurality of bearings and the plurality of thrust bearings are foil bearings.

9. The system as defined in claim 1, further comprising a stator attached to the heat sink and positioned adjacent to the rotor.

* * * * *